United States Patent
Publicover et al.

(10) Patent No.: US 10,915,814 B2
(45) Date of Patent: *Feb. 9, 2021

(54) SYSTEMS AND METHODS FOR TIME-SHARING INTERACTIONS USING A SHARED ARTIFICIAL INTELLIGENCE PERSONALITY

(71) Applicant: Kinoo, Inc., Mountain View, CA (US)

(72) Inventors: Nelson George Publicover, Bellingham, WA (US); Lewis James Marggraff, Lafayette, CA (US); Mary Jo Marggraff, Lafayette, CA (US)

(73) Assignee: Kinoo, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/902,168

(22) Filed: Jun. 15, 2020

(65) Prior Publication Data
US 2021/0004680 A1 Jan. 7, 2021

Related U.S. Application Data

(63) Continuation-in-part of application No. 16/389,856, filed on Apr. 19, 2019, now Pat. No. 10,762,414.

(60) Provisional application No. 62/660,237, filed on Apr. 19, 2018.

(51) Int. Cl.
*G06N 3/08* (2006.01)
*G06K 9/00* (2006.01)
*G06N 99/00* (2019.01)

(52) U.S. Cl.
CPC ........... *G06N 3/08* (2013.01); *G06K 9/00671* (2013.01); *G06K 9/00677* (2013.01); *G06N 99/00* (2013.01)

(58) Field of Classification Search
CPC ...... G06N 99/00; G06N 3/08; G06K 9/00677; G06K 9/00671
USPC .......................................................... 706/12
See application file for complete search history.

(56) References Cited

U.S. PATENT DOCUMENTS

2016/0042648 A1* 2/2016 Kothuri ................. A63F 13/213
434/236

* cited by examiner

*Primary Examiner* — Lut Wong
(74) *Attorney, Agent, or Firm* — William A. English; Vista IP Law Group LLP

(57) ABSTRACT

Systems and methods are described for time-sharing interactions using a shared artificial intelligence personality (AIP) incorporated within multiple human interaction entities (HIEs). An AIP is an understanding construct that may control a variety of communication experiences to support a sense of ongoing social connectedness. An AIP may be instantiated within two or more HIEs that interact with humans in a human, cartoon or pet-like manner. HIEs may include robots, robotic pets, toys, simple-to-use devices, and graphical user interfaces. The AIP may be periodically updated based on human interactions sensed by the HIEs as well as knowledge of historical and ongoing events. The systems may provide two or more users with intuitive machine companions that exhibit an expert knowledge base and a familiar, cumulative personality. HIEs may continue to operate without interruption in the presence of interruptions, and/or the absence of one or more human participants; allowing participants to "time-share" their sense of connectedness.

20 Claims, 12 Drawing Sheets

SYSTEMS AND METHODS FOR TIME-SHARING INTERACTIONS USING A SHARED ARTIFICIAL INTELLIGENCE PERSONALITY

RELATED APPLICATION DATA

The present application is a continuation-in-part of co-pending application Ser. No. 16/389,856, filed Apr. 19, 2019, which claims benefit of provisional application Ser. No. 62/660,237, filed Apr. 19, 2018, the entire disclosures of which are expressly incorporated by reference herein.

FIELD OF THE INVENTION

The present invention relates generally to systems and methods for substantially sharing an artificial intelligence personality (MP; artificial personality, AP; artificial intelligence agent, (MA); or artificial human companion, AHC) among multiple human interaction entities (HIEs). The systems utilize techniques within the fields of computer programming, machine learning [including artificial intelligence (AI), artificial neural networks (ANNs), convolution neural networks (CNNs), and deep learning], human-machine interfaces (HMIs), telecommunications, and cognitive sciences including psychology, linguistics and learning. The systems may provide two or more users with intuitive machine companions that exhibit an expert knowledge base and a familiar, cumulative personality to motivate emotional and cognitive exchanges.

BACKGROUND

As the world moves toward an increasing reliance on distance communication (i.e., interpersonal communication in which the physical gap between participants is beyond the physiological limits of unaided human perception), there is a progressive need to make such interactions more efficient, effective, and socially acceptable. Currently, there is an extensive range of devices and software to facilitate distance communications. These include a wide span of telephonic devices, video conferencing, smart televisions, image exchange tools, texting, chat, instant messaging, paging devices, notification tools, remote classrooms, electronic billboards, and so on.

Notwithstanding the utility of such tools and applications, considerable time may be spent remaining connected, even when there is a desire to perform other tasks, or to at least "time-share" between remaining remotely connected (e.g., to a child or elderly individual) and performing those other activities or tasks (e.g., during work or travel). Those activities may also include "time-sharing" among two or more distance communication participants (e.g., a parent interacting with multiple children, a boss interacting with multiple employees, among multiple colleagues, etc.). Improvements to devices and processes that facilitate interacting at a distance have the potential to impact most major aspects of modern life including work, play, services support, education, and maintaining family and social connectedness.

During busy times, it is all too common to be interrupted or have a need to disconnect from an exchange with a remote participant only to have the interruption or abrupt disconnection perceived by that participant as disinterest. Such perceptions may contribute to feelings of social isolation and/or their being less important than the source of the interruption. This is particularly important within interactions among parents and their children, grandparents and grandchildren, other relatives, exchanges that include mentally challenged individuals, neighbors, colleagues, and close friends. The situation may be further exacerbated if one participant, in particular, repeatedly terminates most social exchanges.

If such exchanges involve a large number of people, then interruptions or abrupt disconnections by an individual might go unnoticed. However, when exchanges involve a smaller number of participants, including just two, then the interruption or disconnection may appear obvious. Discernible interruptions may arise despite a desire on the part of an individual not to reveal to the one or more other participants within an exchange that they are disconnecting, especially if only briefly.

Along similar lines, a parent or guardian may, for example, wish to have a distant child perform one or more tasks that require an extended period of guidance and/or monitoring. Due to other commitments, the parent may have insufficient time to remain continuously connected to the child to instruct, track, and/or compliment the child during each phase of task performance. A sense of connectedness, even via distance communication, may have a strong influence on whether tasks are completed successfully, whether there is a shared sense of accomplishment or satisfaction, and/or whether there is cognitive and emotional learning while performing such tasks.

Similar situations, where some level of engagement (but not necessarily fully focused attention) may be required during the performance of one or more tasks during portions of exchanges between teachers and students, supervisors and employees, workers and their colleagues, doctors and patients, as well as a wide range of other service providers and their clients. Such exchanges may benefit not only from an expert knowledge provided by a shared artificial intelligence personality, but also from the ability of an AIP to determine best times to check-in, to reconnect as tasks are performed and/or if stumbling points are encountered.

The need and effectiveness of reconnecting may also be dependent on individual needs. Knowledge of previous successes and/or failures associated with similar tasks, the skill set of an individual, interests, certifications, age, and the anticipated degree of focus as well as other cognitive and emotional factors (both historical and contemporaneous) are examples of considerations that may play a role to determine an optimal check-in frequency and when reconnecting may be most effective. Approaches are needed to effectively and acceptably (by all participants) make use of such knowledge to optimize distance communications.

Frequent and extended interpersonal communication generally benefits most individuals in society. However, there is a recognized particular need for fostering companionship among many lonely, isolated, and/or confined people. Individuals who generally lack social interactions, support, and regular contact from friends, family, or colleagues frequently become depressed; their health suffers; their life span may be reduced; and they sometimes even become suicidal. Groups of people with an increased tendency for suffering from these effects include the elderly, disabled, prisoners, institutionalized or hospitalized individuals, researchers in extreme conditions, and astronauts.

New paradigms are required to improve the efficiency, effectiveness, productivity, and socially acceptability of distance communications. Although artificial human companions have not yet fully replaced familiar, supportive social interactions among family members, loved ones, friends, counselors, or colleagues; AIPs instantiated within personal HIEs that are familiar and available to a user at any time may help bridge gaps in time and/or "time-shift" interactions when human companions are not available.

SUMMARY

In view of the foregoing, systems and methods are provided herein for substantially sharing an artificial intelligence "personality" (AIP), "character" or "companion" instantiated within two or more human interaction entities (HIEs) implementing a variety of real-time and/or non-real time communication experiences to support a sense of continuous and/or ongoing connectedness. An AIP is an understanding construct that may manage and perform a variety of communication experiences to enhance feelings of connectedness and understanding.

An AIP may be instantiated within two or more HIEs that interact with humans in a human, cartoon, or pet-like manner. In exemplary embodiments, HIEs may include robots, robotic pets, toys, simple-to-use devices, digital assistants, graphical user interfaces and avatars. HIEs may be physical (i.e., solid objects), virtual (i.e., displayed on a screen), or both (interacting simultaneously with a human, or transitioning from one form to another over time). HIE functions may be implemented in the form of a single device that comprises the majority of components necessary for processing, sensing and actuating during human interaction exchanges. Alternatively, HIE functions may be distributed among two or more physical devices that collectively comprise the elements necessary for processing, sensing, and actuating during human interaction exchanges where distributed devices may be referred to as human interaction accessories (HIAs). HIAs may generally, although not necessarily, utilize portable power sources (e.g., one or more batteries, one or more solar panels) and/or be interconnected using wireless communication interfaces and/or protocols (e.g., Wi-Fi, Bluetooth, etc.).

Systems may provide two or more users with machine companions that include an individualized familiarity with each user (enhancing acceptance and believability), an exhibiting of intuitive interactions, a cumulatively acquired personality, an integrated knowledge base, and behaviors to motivate emotional and cognitive exchanges. The AIP may be periodically updated based on human interactions sensed by all, or a subset of, the HIEs as well as knowledge of historical and ongoing events. HIEs may continue to operate without interruption in the present of telecommunications delays or interruptions, and/or the absence of one or more (distant) human participants. The system may improve a sense of connectedness, remove feelings of social isolation, improve learning, enhance enjoyment, and/or allow "time-shifted" exchanges among users.

In accordance with an exemplary embodiment, a method is provided to share an artificial intelligence personality among multiple human interaction entities to support social connectedness between two humans, comprising: providing, in proximity to a first human, a first human interaction entity comprising a first electronic device that includes a first processor, one or more first interaction output devices operatively coupled to the first processor, and one or more first sensors operatively coupled to the first processor; providing, in proximity to a second human, a second human interaction entity comprising a second electronic device that includes a second processor, one or more second interaction output devices operatively coupled to the second processor, and one or more second sensors operatively coupled to the second processor; instantiating a first artificial intelligence personality into the first human interaction entity, comprising installing the first artificial intelligence personality with the first processor such that the first artificial intelligence personality interacts with the first human via the one or more first interaction output devices; acquiring, during an interaction between the first human interaction device and the first human, interaction data from the one or more first sensors; computing, with one or more artificial intelligence processors, a second artificial intelligence personality comprising a single cumulative personality based at least in part on the first artificial intelligence personality and the interaction data; and instantiating, with the second processor, the second artificial intelligence personality into the second human interaction entity.

In accordance with another exemplary embodiment, a method is provided to share an artificial intelligence personality among multiple human interaction entities to support social connectedness between two humans, comprising: providing, in proximity to a first human, a first human interaction entity comprising a first electronic device that includes a first processor, one or more first interaction output devices operatively coupled to the first processor, and one or more first sensors operatively coupled to the first processor; instantiating an artificial intelligence personality into the first human interaction entity, comprising installing the artificial intelligence personality with the first processor such that the artificial intelligence personality interacts with the first human via the one or more first interaction output devices; providing, in proximity to a second human, a second human interaction entity comprising a second electronic device that includes a second processor, one or more second interaction output devices operatively coupled to the second processor, and one or more second sensors operatively coupled to the second processor; instantiating the artificial intelligence personality into the second human interaction entity, comprising installing the artificial intelligence personality with the second processor such that the artificial intelligence personality interacts with the second human via the one or more second interaction output devices; acquiring, during an interaction between the first human interaction device and the first human, interaction data from the one or more first sensors; determining, by the first processor based on the interaction data, a first human desire to stop interacting with the second human; transmitting, from the first processor to the second processor, the first human desire; and initiating, by the artificial intelligence personality using the one or more second interaction output devices, one or more pre-determined activities with the second human.

In accordance with still another exemplary embodiment, a method is provided to share an artificial intelligence personality among multiple human interaction entities to support social connectedness between two humans, comprising: providing, in proximity to a first human, a first human interaction entity comprising a first electronic device that includes a first processor, one or more first interaction output devices operatively coupled to the first processor, and one or more first sensors operatively coupled to the first processor; instantiating an artificial intelligence personality into the first human interaction entity, comprising installing the artificial intelligence personality with the first processor such that the artificial intelligence personality interacts with the first human via the one or more first interaction output devices; providing, in proximity to a second human, a second human interaction entity comprising a second electronic device that includes a second processor, one or more second interaction output devices operatively coupled to the second processor, and one or more second sensors operatively coupled to the second processor; instantiating the artificial intelligence personality into the second human interaction entity, comprising installing the artificial intelligence personality with the second processor such that the artificial intelligence personality interacts with the second human via the one or more second interaction output devices; acquiring, during an interaction between the first human interaction device and the first human, interaction data from the one or more first sensors; determining, by the first processor based on the interaction data, one or more first human directives to the second human; transmitting, from the first processor to the second processor, the one or more first human directives; and initiating, by the artificial intelligence personality using the one or more second interaction output devices, the one or more first human directives to the second human.

Other aspects and features including the need for and use of the present invention will become apparent from consideration of the following description taken in conjunction with the accompanying drawings.

BRIEF DESCRIPTION OF THE DRAWINGS

A more complete understanding of the present invention may be derived by referring to the detailed description when considered in connection with the following illustrative figures. In the figures, like-reference numbers refer to like-elements or acts throughout the figures. The presently exemplary embodiments are illustrated in the accompanying drawings, in which.

DETAILED DESCRIPTION OF THE EXEMPLARY EMBODIMENTS

Figure 1:
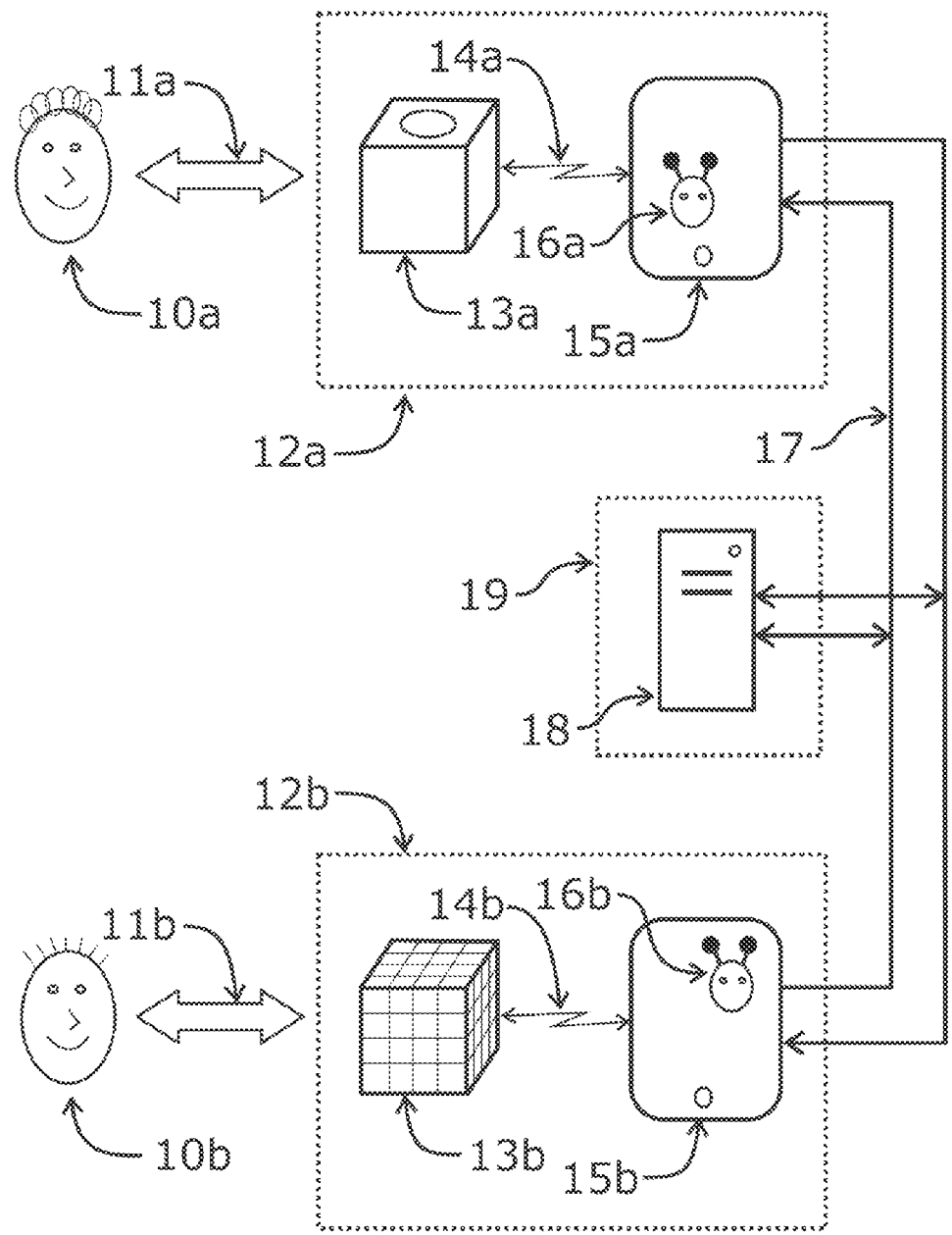
FIG. 1 is an example of interconnections and layout of key elements supporting distance communication between two humans, augmented by human interaction entities (HIEs) instantiated with a shared artificial intelligence personality (AIP).

In exemplary embodiments, an artificial intelligence personality (AIP) is substantially shared among two or more human interaction entities (HIEs). HIEs facilitate a wide range of real time and non-real time communication experiences to support a sense of ongoing social connectedness. The system may be implemented using two or more HIEs (including HIAs) and, optionally, one or more remote and/or distributed processors to compute updated AIPs and/or sequence telecommunications. AIPs may be periodically updated based on human interactions sensed by the two or more HIEs, events external to the environment of the HIEs, or following pre-determined intervals. AIPs may also be updated based upon the availability of computational resources and/or some other form of direction provided by other parties such as technicians, psychologists, counselors, teachers, advisors, supervisors, other humans, and/or other AIPs.

The system may provide two or more users with intuitive machine companions that exhibit an integrated knowledge base and a personality cumulatively acquired from all, or a subset of, interactions, or simulated or virtual interactions with users. Experiences may reflect and motivate appropriate social interactions to evoke emotions and reinforce bonding or connectedness, and are regular reminders of the social pact that exist between the humans, even when separated by some distance. Since the shared AIP instantiated within HIEs "knows" (as allowed by each user) most or all activities by human members of a network, HIEs may decide what, how, when, and why to share information, experiences, emotions, or interactions with any member(s) of a group to amplify social interchange.

A vast array of social interactions sensed by one HIE may be shared with one or more other humans via a shared AIP instantiated within their HIEs (and HIAs). Some examples of "milestone" and other events that may trigger such sharing via one or more remote HIEs include: receiving a raise, a child taking a first step or losing a first tooth, acing a test, having a birthday, winning a ball game, eating something delicious, listening to a great song, watching a cool movie, capturing an awesome photograph, playing a practical joke, and so on. Such sharing, particularly when separated by long distances, may be a vital part of feeling "connected."

Reactions and behaviors of the humans may be shared via curation and/or interpretation by a shared AIP instantiated within HIEs to engage in an educational interchange of information, demonstrations of learning, and/or advancement of thought regarding a topic area. In other words, the entities or the humans may establish, maintain, and/or swap roles as students versus teachers or mentors for remote educational experiences. An AIP may be taught by one or more humans and pass this new learning on to other humans via one or more coupled HIEs. Teaching may be formal or informal, including tricks, dances, games, songs, news, forms of affection, friendly mischievous activities, and forms of language.

In addition to interpreting, curating, and mediating interactions, a shared AIP may, at times, recognize needs and initiate actions (including facilitating the establishing of remote connections) to evoke certain behaviors, to assure engagement and shift emotions. In other words, HIEs instantiated with a shared AIP may play the role of counselor and/or spiritual guide. Teaching of skills or knowledge to evoke emotion may be particularly well-suited to the social exchanges necessary to support an ICE (i.e., isolated, confined and extreme condition) human.

In further embodiments, a shared AIP may initiate an exchange with a human based on: 1) learning about an event during an interaction with another human sharing the AIP, 2) an assessment that a "critical mass" of multiple events worthy of being reported has transpired with another human sharing AIP exchanges, 3) an assessment that a "critical mass" of multiple events has transpired cumulatively among multiple humans sharing the AIP, 4) periodically, for example, at the same time each day or week, and/or 5) upon declaration of an important or emergency situation by one or more users, or the shared AIP.

HIEs (more precisely, the shared AIP instantiated within HIEs) may curate gameplay between remote humans. A HIE might observe a human in its local environment, making a move on a board and then display the move to a human associated with a remote HIE (in essentially real time, or "time-shifted" at some later time), invoking a response from the human for another move and communicating the move. As HIEs engage in supporting social connection, either of the HIEs may add their own commentary, or play a role in the gameplay. For instance, a HIE could chuckle when its human makes a move, reward the human with a song, or collaborate and guide its human in a supportive or sneaky manner.

HIEs (human interaction entities) may be 1) physical, 2) virtual, or 3) a combination of physical and virtual, particularly at different times or within different environments (e.g., a physical device when a user is seated and a related virtual avatar displayed on a mobile device when moving about). Physical HIEs may include robots (moveable or substantially stationary), robotic pets, robotic toys (e.g., dolls, teddy bears, baby-like figures, mechanical constructions), and human-like objects. Virtual HIEs may have features found in avatars, digital assistants, cartoon characters, or synthesized persons or pets that may be displayed on computer monitors, screen, laptops, mobile devices (phones, tablets, smart watches, etc.) or other display devices including augmented reality, mixed reality and virtual reality headwear. Virtual HIEs may also be displayed as holograms, holographic-like projections, light-field projections, and other techniques that make video objects appear 3-dimensional.

In exemplary embodiments, HIEs may include environmental sensors (i.e., sensors measuring one or more elements within the environment of the HIE, and human interaction sensors (i.e., measuring interactions between the AIE and a user). Environmental sensors may include cameras (i.e., directed toward the environment of a user), light sensors, thermal sensors, motion sensors, accelerometers, global positioning system (GPS) transceivers, microphones, infrared (IR) sensors, galvanometric sensors, pressure sensors, switch sensors, magnetic sensors, proximity sensors, date and time clocks, Bluetooth transceivers, and Wi-Fi transceivers. Environmental sensors may also include devices worn by a user (but directed at the environment) such as smart glasses (e.g., Google Glass), augmented reality headwear, earbuds (e.g., with a microphone), smart watches, and so on. Human interaction sensors may include cameras (i.e., directed toward the user), thermal sensors, motion sensors, accelerometers, microphones, infrared (IR) sensors, galvanometric sensors, heart rate sensors, electrocardiogram sensors, electrooculogram sensors, electroencephalogram sensors, pulse oximeters, pressure sensors, magnetic sensors, activity monitoring devises, computer mice, joysticks, keyboards, touch screens, and proximity sensors. Optionally, both environmental and human interaction cameras may include the ability to pan and zoom.

In cases when a HIE comprises a physical device (or a collection of interacting and/or coupled human interaction accessories, HIAs), the acceptability of human interactions may be enhanced by movements, gestures, information displays, pointing, sounds, and other forms of HIE/HIA output or interaction. Actuators or other output components may include one or more video display devices, hologram display devices, holographic-like projectors, speakers, propulsion systems, servos, motors, magnetic field controllers, orientation controllers, haptic controllers, light and other forms of pointing devices, switch controllers, actuators for appendage control, and controllable tactile surfaces.

In exemplary embodiments, HIE outputs may change, depending on time and circumstances. For example, a full range of HIE outputs may be utilized in a stationary environment while video-only exchanges are performed in a mobile setting and/or audio-only outputs may be produced, for example, while driving. Generally, more freedom of movement may be available using untethered HIEs and/or HIAs (i.e., not connected to any fixed wired power or wired telecommunications source). Tethered HIEs may allow for continuous interaction (with fewer concerns regarding power consumption, battery life, etc.) and/or more sophisticated interaction devices (e.g., holographic displays, projected images, etc.). In further exemplary embodiments, a combination approach may be employed, where wireless telecommunications are used during most interchanges during the daytime and the recharging of batteries and updating of shared AIP data are additionally performed when tethered (e.g., while asleep).

For the purposes of the present application, an AIP (artificial intelligence personality) is an understanding construct that interacts with one or more humans in a human, cartoon, or pet-like manner. An AIP may include a background or database of: 1) information, 2) memories and/or 3) experiences. At the core of an AIP is an artificial intelligence that may be implemented by combinations of traditional programming, and forms of machine learning including convolution neural networks and/or other deep learning techniques. Neural networks may encompass large components of an artificial intelligence, such as control of actuators (of a HIE or HIA) to express a wide range of behaviors; or be segmented into sub-components where each subsystem performs specific tasks, such as emotion recognition, searching strategies to acquire new information, speech recognition, word translation, speech formation, facial feature recogognition, gesture recognition, animation display, control of articulated movements, and so on.

In exemplary embodiments, AIP information may be: 1) embedded within machinery (e.g., software, firmware and/or neural networks), or 2) incorporated by including the capability of being able to search for information when needed using telecommunications such as searching the internet and/or so-called "cloud." Some information may be specifically taught to an AIP, such as the birth dates of all users within a network as well as their relatives and acquaintances. Other information may be known and available more globally, accessed via internet search strategies that are known in the art. Searching and selecting information along with the ability to synthesize new information from such multiple sources greatly expands the "intelligence" component of an AIP.

AIP memories include those gathered using device sensors from the environment of one or more users. For example, the overall locations of a HIE (using, for example, GPS methods known in the art and/or forms of localization using object recognition to identify objects at known relative locations within video images) recorded over time and/or, for example, the time of day that a wake-up alarm frequently rings may become an AIP memory. An aspect of the AIP is an ability to store selected memories (e.g., as permitted by each user) from the environments of two or more users. Such a common database may allow more meaningful behavioral interactions to be enacted, enabling the AIP to more closely link the interactions of its users (e.g., separated by geographic distance).

In further embodiments, AIP memories and experiences include those acquired using human interaction sensors as a result of interactions with AIP users. Such interactions are often multi-modal in nature, involving inputs from a number of sensors (audio, visual, tactile, etc.), sensing over a wide range of scales (e.g., camera sensors the detect small movements of the eyes, larger movement of the head, or gross gestures observed when viewing the entire body), and over a wide range of time scales (from milliseconds to months). In other words, the AIP may be able to more effectively share social interactions among users as a result of a common database of memories and experiences acquired from extensive interactions with each user individually.

More specifically, interaction data may include:
1. data acquired from one or more of the environmental sensors,
2. data acquired from one or more of the human interaction sensors,
3. physical states of one or more humans within the vicinity of a HIE,
4. physiological states of one or more humans within the vicinity of a HIE,
5. cognitive states of one or more humans within the vicinity of a HIE,
6. emotional states of one or more humans within the vicinity of a HIE,
7. changes in the physical, physiological, cognitive, or emotional states of one or more humans within the vicinity of a HIE,
8. one or more spoken words within the vicinity of a HIE,
9. one or more recognized objects within images acquired by a HIE, and
10. one or more gestures performed by one or more humans within the vicinity of a HIE.

In additional embodiments, AIP memories and experiences may also include those acquired using HIE/HIA sensors as a result of interactions with one or more other HIEs. As with HIE-human interactions, physical HIE-HIE interactions are typically multi-modal in nature. HIE-HIE interactions may be between or among HIEs that share an AIP, or interactions may be among HIEs that are instantiated with different AIPs. The ability to interact with AIP memories and experiences may be greatly enhanced by having HIEs project historical image, video and/or audio recordings of interactions.

In addition, HIE-HIE interactions may not necessarily involve physical interactions. In other words, HIE-HIE interactions, particularly involving different AIPs, may occur in a virtual space (and/or over an accelerated timeframe compared to physical interactions). HIEs may also interact autonomously with the humans associated with HIEs instantiated with distinct AIPs, or with humans (pets, or other entities) that are not associated with any HIE. Once such HIE interactions occur, consequences and/or results of the interactions may be conveyed by the HIEs to their human counterparts (i.e., users).

In exemplary embodiments, an AIP may be designed to substantially share a single AIP among two or more HIEs (including HIAs). Even with a substantially common AIP knowledge base, each user may be the recipient of a somewhat different AIP experience for a number of possible reasons:
1. During periods when there is a delay or interruption in communications associated with the distribution of updated AIPs, a "local" AIP may have recently acquired experiences that have not yet been transmitted to one or more "remote" AIPs.
2. An AIP for one or more individuals may be customized or tailored, for example, to accommodate special needs of an individual.
3. The sensed environment may require differing responses to the same interactions, for example to broadcast (audio) more loudly to accommodate a noisy environment.
4. While the AIP is a single, cumulative personality that is updated and adapts based upon new experiences, its interactions with users may vary based upon the specific circumstances, contexts, preferences, and variable performance of each user. For example, if an AIP is aware that a particular user is not interested in sports, then, although another user may be updated by the AIP with recent sports scores, recent sports scores may be offered only upon request. Along similar lines, an AIP may suggest accompanying a user while playing a musical instrument only if the AIP has been made aware that the user is capable of playing.
5. As noted above, not all sensed information may be allowed to be distributed among all users. For example, acquired knowledge of financial or medical records and measurements associated with any medical conditions (including undiagnosed, potential conditions) may be restricted to each individual user. This may include actions where the sensitive knowledge may be inferred, such as during discussions or physical interactions that would point to such a sensitive condition.

As described more fully in co-pending application Ser. No. 16/389,856, filed Apr. 19, 2019 (incorporated by reference herein), AIP interactions may be combined with archived data and sensed inputs to perform a substantially continuous assessment of human factors such as attention, learning, performance and health. Such substantially continuous monitoring may be performed in a covert manner (i.e., measurements particularly of the timing and content of human responses during the normal course of AIP interactions) or overtly, for example, by periodically performing performance tests that may be in the form of games, quizzes and/or physiological testing. Data acquired by AIPs may also be used within efforts to help mitigate some aspects of degraded human health and/or performance.

In exemplary embodiments, FIG. 1 shows key elements using a shared AIP to conduct and augment an exchange between two humans 10a, 10b. One user 10a interacts 11a with a HIE 12a that may or may not include the display of a cartoon-like character 16a facilitating interactions with the shared AIP. Similarly, a second user 10b interacts 11b with a HIE 12b that may or may not include the display of a cartoon-like character 16b facilitating the second user's interactions with the shared AIP.

In FIG. 1, the tablet 15a and HIA 13a in proximity to a first user 10a, collectively form the HIE 12a associated with that user 10a. The one or more devices 15a and/or HIAs 13a that comprise the HIE 12a of the first user 10a may communicate 14a wirelessly, be tethered by cabling, or a combination of both. Similarly, the tablet 15b and HIA 13b in proximity to a second user 10b, collectively form the HIE 12b associated with that second user 10b. HIE components, including one or more HIAs, of the second user may also be tethered and/or communicate wirelessly 14b. HIEs associated with each user may be adapted for the particular desires (e.g., color, size, weight) and needs (e.g., visual and/or auditory accommodations, age-appropriate design) of the user as well as their environment (e.g., stationary versus mobile, quiet versus noisy, bright versus dim lighting, confined space, etc.).

Two or more HIEs 12a, 12b may communicate 17 with each other, generally over some distance involving components of the internet (e.g., TCP/IP) and/or other communications protocols (e.g., 4G, 5G, direct to satellite). Optionally (indicated by the dashed-line enclosure 19 in FIG. 1), telecommunications may include one or more remote processors (that may include multi-core processing, dedicated AI hardware and/or quantum computing capabilities) that may be used to train and/or update a shared AIP, as well as to sequence telecommunications and perform other computational housekeeping tasks. The computation of new and/or updated AIPs may be centralized (e.g., using dedicated processors 18), involve cloud computing using larger scale distributed processing (not shown), and/or be performed within HIEs 12a, 12b. The process of updating a shared AIP may comprise a range of computational approaches extending from large scale retraining of entire AI networks to, for example, relatively simple updating of an AIP memory. Computational approaches to update AIPS may use processing resources within an HIE and/or share resources among HIEs.

Figure 2:
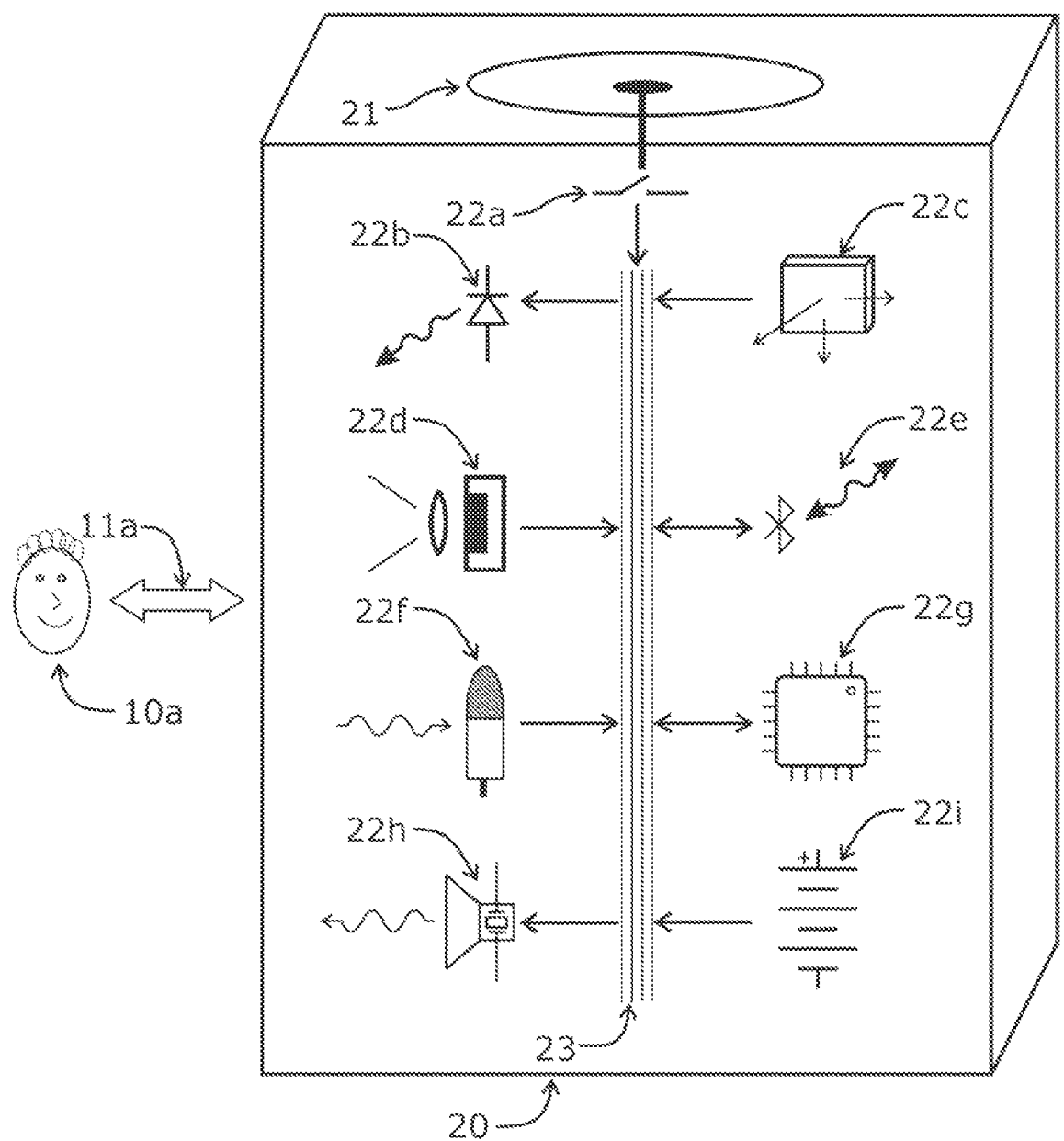
FIG. 2 shows some sensor and actuator components that may be included in one or more relatively simple, inexpensive human interaction accessories (HIAs) comprising an element of a human interaction entity (HIE).

In further exemplary embodiments, FIG. 2 illustrates some of the components that may be included in an inexpensive, robust, light-weight HIA 20 to support human interactions with a shared AIP. The HIA 20 may, for example, be used to simply alert a local user 10a of a desire to connect with a distant user (see FIG. 3A). The local user 10a may then continue to interact using the HIA 20 or switch to using other elements of a HIE (see, e.g., FIGS. 3A & 3B) to continue with the connection. A HIA 20 may be adapted specifically to accommodate the needs of, for example, a young child (e.g., a colorful toy where user responses may be indicated by simply shaking the HIA), a visually impaired individual (e.g., with mostly auditory indications and large buttons to sense user responses), the driver of a moving vehicle (e.g., with accommodations for vehicle attachments and adapting to different lighting conditions so as not to be distracting), the elderly (e.g., where the timing of interactions and anticipated responses may be adapted to suit the individual), and so on.

Examples of sensor and actuator components that may be incorporated in a HIA as shown in FIG. 2 include:
 1. a contact switch 22a physically connected to a large push-button 21 on an accessible surface of the HIA 20,
 2. an accelerometer 22c that may sense HIA motion and/or orientation relative to the earth's gravitational field in 1, 2 or 3 dimensions,
 3. a light source (or array of light sources) 22b such as light emitting diodes (LEDs) to alert a user and/or display information,
 4. a camera 22d (shown including a lens assembly) to image the environment of the HIA,
 5. a microphone 22f to detect speech and other sounds in the environment of the HIA, and
 6. a speaker (or piezo buzzer) 22h that produces auditory stimuli within the HIA environment.

In addition to such sensor and actuator components, a HIA 20 may typically include a battery (single use or rechargeable) 22i to provide remote power for electronic components. HIAs also generally require some level of processing capabilities 22g. This can range from simple (low-power) controller circuitry such as a field-programmable gate array (FPGA), application-specific integrated circuit (ASIC) or microcontroller, to more sophisticated central processing units (CPUs). Communication between the HIA and other components of the HIE may be via a wireless transceiver 22e. Communications protocols may include Bluetooth (as shown in FIG. 2 22e), Wi-fi (including low-power Wi-fi) and/or other short-range telecommunications standards.

Interconnections between HIE elements 22a, 22b, 22c, 22d, 22e, 22f, 22g, 22h, 22i may be accomplished via a bus structure 23 implemented within a printed circuit board (PCB) or flexible circuit. Directional arrows to/from the bus 23 in FIG. 2 indicate the primary direction for the flow of information or power to/from some HIA elements 22a, 22b, 22c, 22d, 22f, 22h, 22i; although a lesser quantity of data may flow opposite the primary direction to/from some HIA elements (e.g., data are generally also sent to cameras to control camera characteristics including sensitivity, frame rate, etc.).

Figure 3A:
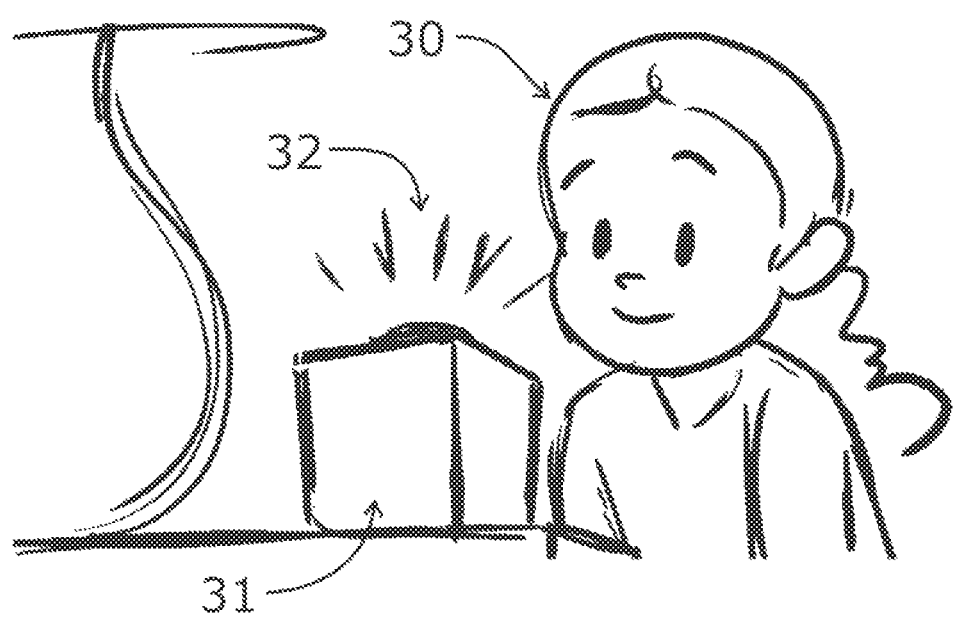
FIG. 3A illustrates a young child being alerted via a human interaction accessory (HIA) to a desire by a contact to connect with her.
Figure 3B:
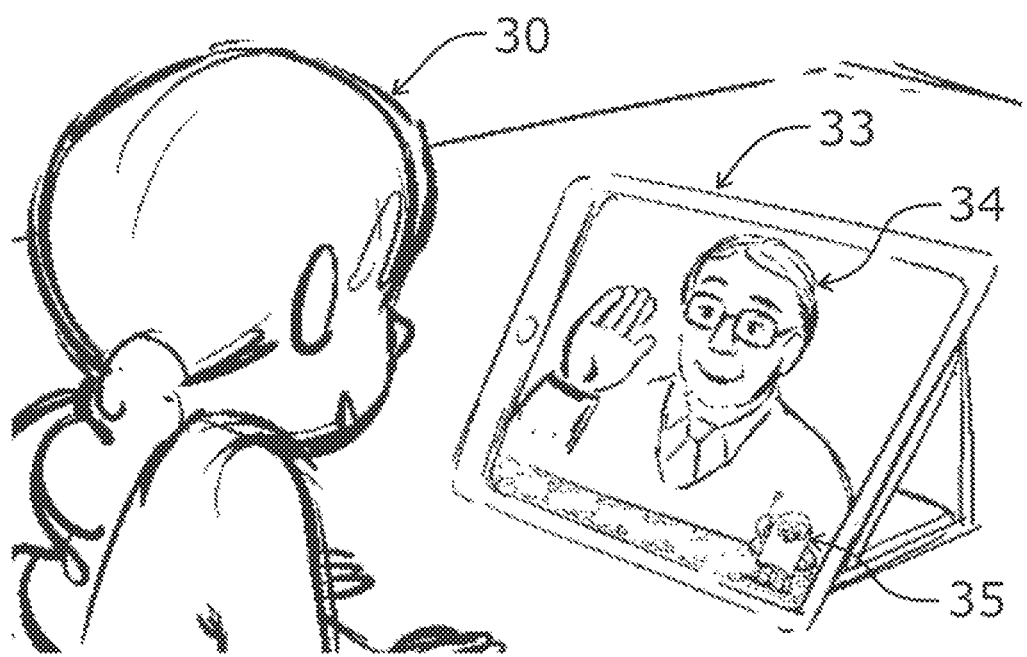
FIG. 3B shows a scene from a distance communication session, augmented by a shared artificial intelligence personality (AIP), between the young child illustrated in FIG. 3A and her grandfather.

FIG. 3A demonstrates an example of an alert 32 to a local user 30, issued by the local user's HIA 31, requesting a desire to connect by a distant user (see FIG. 3B). In this exemplary embodiment, the HIA is a portable device 31, transmitting wirelessly (not shown) to one or more processors relaying distance communication data. The alert 32 may, for example, be in the form of an emitted sound, vibration, and/or blinking light.

FIG. 3B expands upon the scenario depicted in FIG. 3A. Once alerted by the small, inexpensive, toy-like HIA (31 in FIG. 3A), the local user 30 switches to communicating with the distant user via a tablet device 33 where an image of the distant user 34 is displayed on the tablet screen 33. In this scenario, the local user is a young girl 30 communicating with her grandparent 34.

Also displayed on the tablet screen 33 is a cartoon-like character 35 representing a shared AIP as a virtual image. The AIP 35 may participate directly in the distance communication, remain silent while there is human-to-human exchange, or participate intermittently, for example, during game play, to look up information not known to either user, to remind a user of upcoming commitments, and the like. The AIP represented by the virtual image 35 may also monitor the exchange between the young girl 30 and her grandparent 34 to encode and store information (including from all environmental and interaction sensors within all HIEs involved in the exchange) for future reference and retrieval. The AIP represented by the virtual image 35 may also be called upon by a user (triggered, for example, using a shared AIP name or keyword) to perform tasks and/or participate in the exchange, particularly during brief periods when a distant user may need to perform a separate activity, not associated with the exchange.

Figure 4:
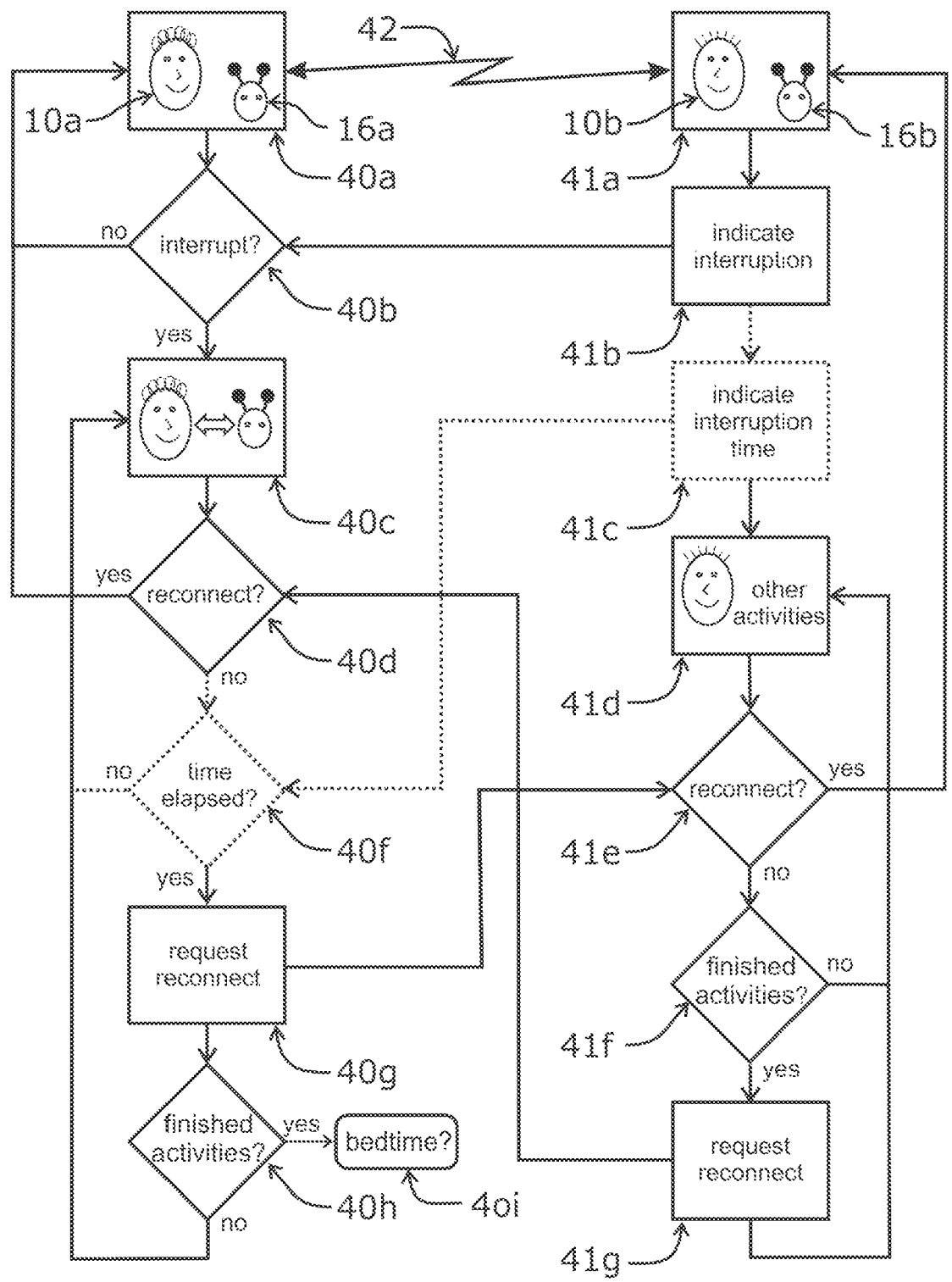
FIG. 4 is a flow chart of continuing activities supported by a shared artificial intelligence personality (AIP) when a participant engaged in distance communication redirects focus to another activity, causing the distance communication to be interrupted (for a defined period or indefinitely).

FIG. 4 is a flowchart chart illustrating key computational steps to manage, using a shared AIP, a desire 41b by a distant participant 10b to disconnect, during a distance communication 42 session, from a local user 10a. The disconnection by the distant participant 10b may be performed 1) overtly, making it clear to the local participant 10a that the session is about to be interrupted; 2) covertly, in a manner that does not make it obvious to the local user 10a that a disconnection is about to happen; or 3) in a manner that utilizes the AIP 16a within the HIE of the local user 10a to be an informant to the local user 10a regarding the disconnection and/or subsequent activities. The desire to disconnect may be for a specified and/or anticipated period of time 41c, or indefinitely (e.g., at bedtime).

In the exemplary embodiment illustrated in FIG. 4, one or more predetermined activities to be performed subsequent to disconnection may be known to the shared AIP. These one or more activities may have been pre-determined by the local user 10a, generated by the distant participant 10b, or agreed upon by both participants 10a, 10b possibly including input from other individuals (e.g., parent, guardian, friend, counselor, employer, etc.). Examples of the one or more pre-determined activities include one or more of playing a game, participating in play with a toy, reading a story, watching a video, critiquing a movie, conversing, initiating a conversation with one or more other humans, performing a learning experience, helping to write a communication, drawing a picture, exercising, coding a program, paying a bill, planning an activity, reminding about upcoming events, building a virtual object, helping to construct a real object, and instructing to go to bed.

As illustrated in FIG. 4, activities 40a by the local user 10a during distance communications 42 with the distant participant 10b may (i.e., optionally) include interacting with a shared AIP via the HIE 16a associated with the local user 10a. Similarly, activities 41a by the distant participant 16b may include interactions with the shared AIP via the HIE 16b associated with the distant participant 10b.

Using his/her HIE, the distant participant may indicate a desire to interrupt distance communication 41b that is made known to the shared AIP and subsequently transmitted 40b to the HIE associated with the local user 10a. Upon interrupted distance communication, the local user 10a may continue to interact with the shared AIP 40c via his/her HIE 16a (i.e., absent the distant participant).

During this time for separate activities, the HIE (as described previously, more precisely, the AIP instantiated within the HIE) associated with the local user 10a may check to see if a request to reconnect 40d has been made by the distant participant 41g (i.e., via knowledge available to the shared AIP). If so, the two participants re-establish a distance communication 42. If not, then the HIE associated with the local user 10a may determine if an optional (indicated by dashed lines in FIG. 4) time for interruption/disconnection was specified by the distant participant 41c and, if so, whether that time has elapsed 40f. If an interruption time was provided and that time has elapsed 40f, then a request 40g is made to reconnect with the distant participant 41e. Otherwise, a further determination is made whether local user activities are finished 40h and, if not, then to resume those activities 40c. Otherwise, (i.e., activities are finished) the local user is free to move on to other ventures (with or without involving his/her HIE), such as determining whether it is bedtime 40i.

Once a distant participant has indicated a desire to interrupt 41b a distance communication 42, he/she may optionally (indicated by dashed lines in FIG. 4) specify an estimated time to be incommunicado or whether disconnection is to be for an indefinite period 41c. Once specified 41c, the distant participant 10b may move on to desired activities 41d (i.e., absent participation by the local user) that may, or may not involve his/her HIE 16b. During these activities, the shared AIP may check whether a request to reconnect has been made 41e by the local user. If so (and if desired by the distant participant), distance communication 42 may be re-established. If not, then the distant participant may determine if his/her remote activities have been completed 41f. If so (and if desired by the distant participant), a request may be made to reconnect 41g and (via knowledge available to the shared AIP) transmitted to the local user 40d.

Figure 5:
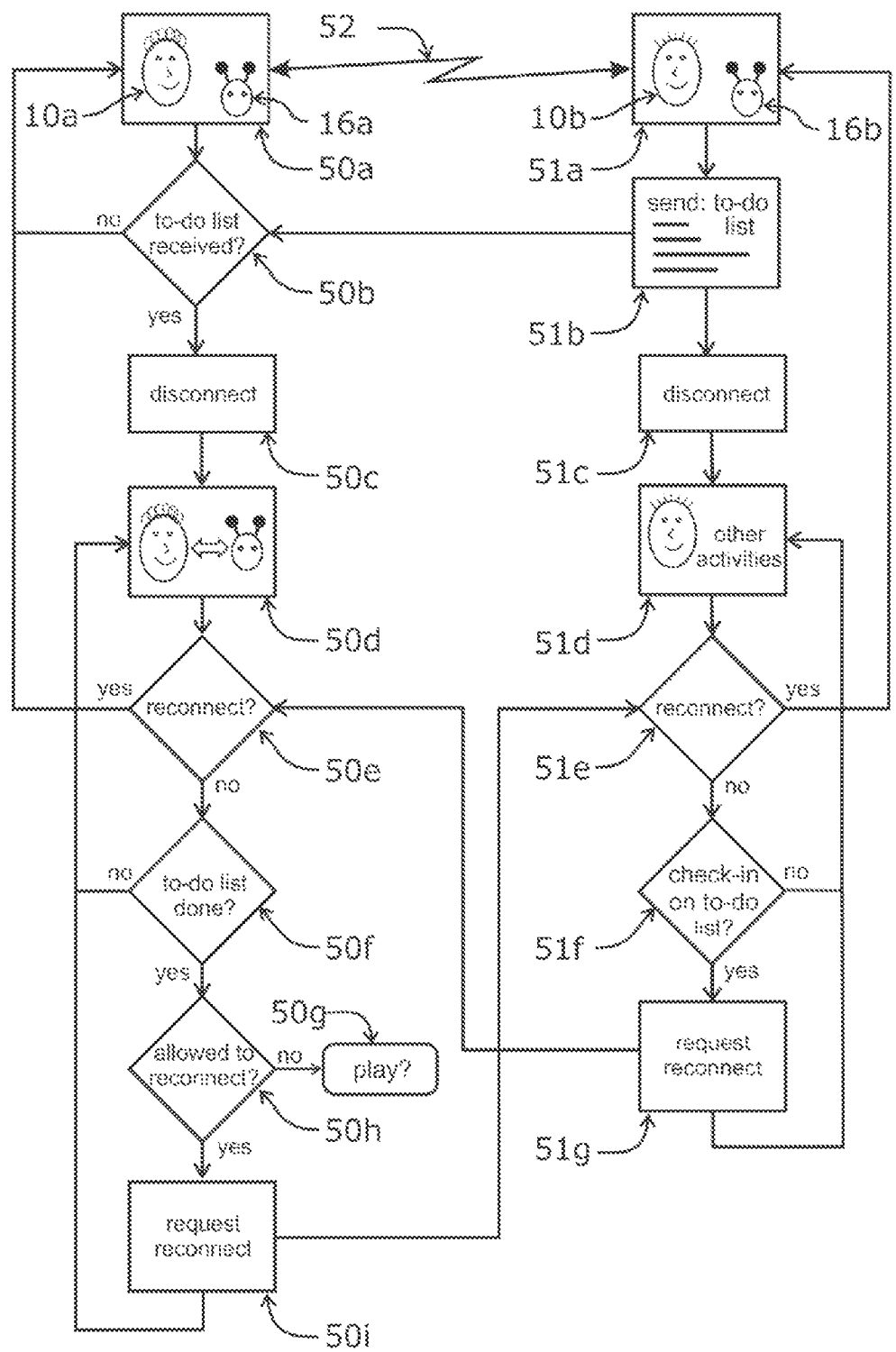
FIG. 5 is a flow chart of participant activities engaged in distance communication when a distant user provides one or more directives (i.e., a "to-do list") that may be performed, aided by a shared artificial intelligence personality (AIP), while the distant user is disconnected.

In further exemplary embodiments, FIG. 5 is a flowchart chart illustrating key components of steps to manage, using a shared AIP, a request 41b by a distant participant 10b to disconnect from a distance communication 42 while providing one or more tasks or directives (i.e. a "to-do list", 51b) to be performed by another user 10a while disconnected. The disconnection between users may be for the time required or expected to complete tasks, allowing the user who performed the tasks 10a to initiate reconnection once completed. Alternatively, the user performing tasks 10a may not be allowed (e.g., by the distant user 10b, due to a lack of availability of transmission facilities at the time, or for some other reason) to reconnect, even after the one or more tasks have been completed.

In further embodiments, reconnecting may be permitted and/or expected by the user performing the tasks 10a when some portion of tasks has been completed, whenever issues arise while performing the tasks, and/or periodically. Similarly, reconnecting may be permitted and/or expected by the distant user 10b at one or more pre-determined times, periodically, when the expired time appears excessive for completing tasks, and/or as his/her 10b schedule permits.

These one or more directives may have been pre-arranged, produced by the distant participant 10b, agreed upon by both participants 10a, 10b, and/or include input from other individuals (e.g., parent, guardian, friend, counselor, employer, lawyer, etc.). The one or more tasks or directives may include one or more of playing a game, participating in play with a toy, reading a story, watching a video, conversing, initiating conversation with one or more additional humans, participating in a learning experience, writing a communication, constructing a drawing, exercising, coding a program, paying a bill, reminding about upcoming events, building a virtual object, constructing a real object, and instructing to go to bed.

As illustrated in FIG. 5, activities 50a by the local user 10a engaged in distance communications 52 with the distant participant 10b may (i.e., optionally) include interacting with the shared AIP via the HIE 16a associated with the local user 10a. Similarly, activities 51a by the distant participant 16b may include interactions with the shared AIP via the HIE 16b associated with the distant participant 10b.

Using his/her HIE (or HIA) instantiated with the shared AIP, the distant participant may produce directives (i.e.

"to-do" list, 51*b*) that are transmitted to the local user's 10*a* HIE. Once sent, the distant user disconnects 51*c* from the interchange and, upon receipt of the to-do list 50*b*, the local user also disconnects 50*c* from distance communications. At this time, the distant user is free to conduct other activities 51*d* that may or may not include exchanges with the shared AIP. Similarly, the local user may begin work on assigned tasks (and/or other activities) 50*d* with or without exchanges with the shared AIP.

While performing tasks and/or other activities, the local user 10*a* may query whether the distant user 10*b* has made a request to reconnect 50*e*. If so, then the process to reconnect may be re-established 50*a*. Otherwise, a determination may be made by the local user 10*a* as to whether the "to-do list" is complete 50*f*. If not, then activities to complete assigned tasks continue 50*d*. Otherwise, a determination may be made by the local user 10*a* as to whether he/she is allowed to reconnect 50*h* with the distant user 10*b*. If so, a request to reconnect 50*i* is sent to the distant user's HIE and activities are resumed 50*d* until the request to re-connect is acknowledged 50*e* by the distant user. If not allowed or if there is no need to reconnect, then the local user may proceed to other activities, such as playtime 50*g*.

Along similar lines, while performing other activities 51*d*, the distant user 10*b* may query whether the local user 10*a* has made a request to reconnect 51*e*. If so, then the process to reconnect may be re-established 51*a*. Otherwise, a determination may be made whether to "check-in" 51*f* on progress by the local user 10*a* in completing the "to-do list". If no check-in is desired, then the distant user 10*b* may return to his/her activities 51*d* that do not involve distance communication. If a check-in or wish to reconnect is desired, then a request to reconnect 51*g* is sent to the local user's HIE and activities are resumed 51*d* until the request to re-connect is acknowledged 51*e* by the local user.

Overall, this scheme allows a distant user 10*b* to assign tasks to another user 10*a* while efficiently and effectively reconnecting with the other user 10*a* only at times when needed or as desired. Directives or tasks assigned by a distant user may optionally include instructions regarding how tasks are to be completed and/or other information (e.g., rewards to be provided upon completion, who to contact if issues are encountered, deadlines, etc.). Thus, the scheme further allows one to "time-shift" directive and/or instructional exchanges, particularly those that involve specialized approaches, an extensive number of steps, difficult concepts, input from multiple sources, and the like.

Figure 6A:
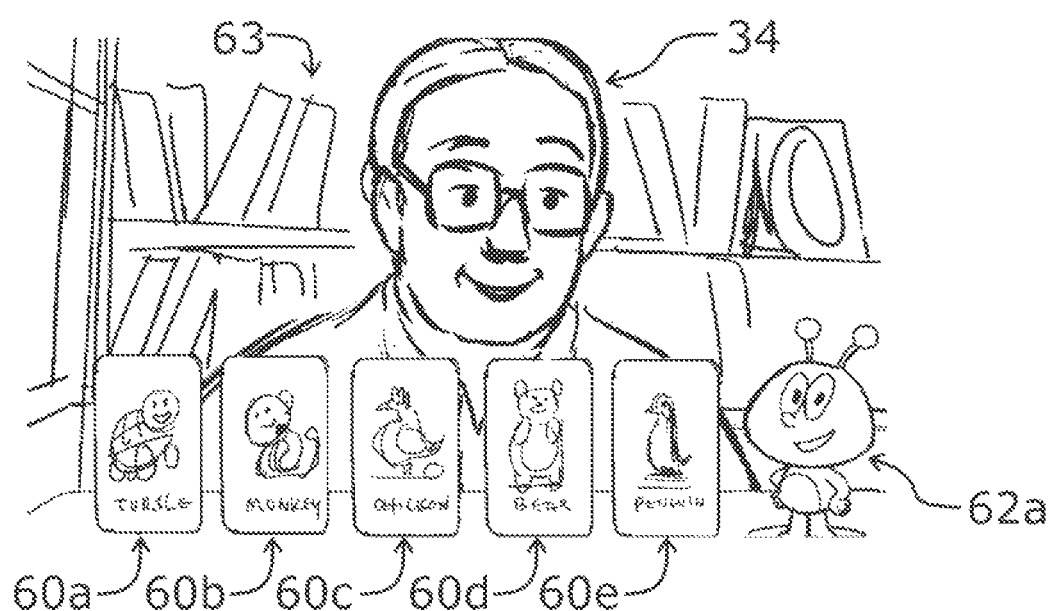
FIG. 6A illustrates key elements that allow interactions between a user and a human interaction entity (HIE) and/or human interaction accessory (HIA) instantiated with an artificial intelligence personality (AIP) to be cast to a television.

FIG. 6A shows an example of a scene in which game play is initiated by a human (in this case, a grandparent) 34 and facilitated by an AIP represented within a video stream by a cartoon-like character 62*a*. The game consists of a child (30 in FIG. 6B, not shown in FIG. 6A) selecting a favorite card from a selection of virtual cards 60*a*, 60*b*, 60*c*, 60*d*, 60*e*. The virtual cards 60*a*, 60*b*, 60*c*, 60*d*, 60*e* are superimposed onto the video stream directed to the child that also shows the grandparent and his environment 63.

Figure 6B:
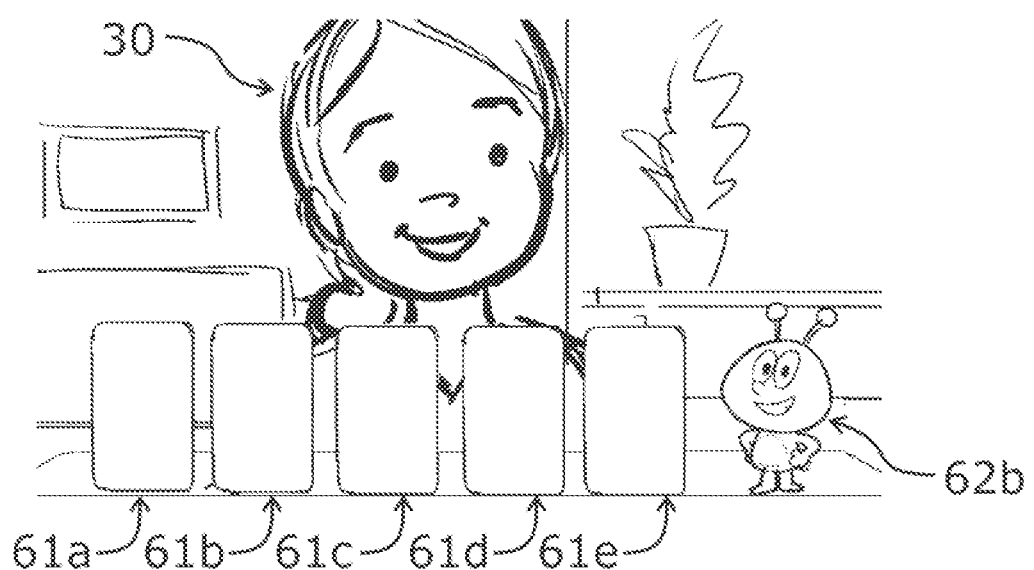
FIG. 6B illustrates a scene within a home when distance communications augmented by a shared intelligence personality (AIP) are cast to a large screen so that engagement and interactions may be shared with family or friends.

FIG. 6B shows a scene that occurs later in the scenario depicted in FIG. 6A. At this time, the child 30 continues to play the card game (where the backsides of the virtual cards 61*a*, 61*b*, 61*c*, 61*d*, 61*e* can be seen in FIG. 6B). The cards 61*a*, 61*b*, 61*c*, 61*d*, 61*e* as well as a cartoon-like character 62*b* that facilitates interactions with a shared AIP are shown on a display directed at the child 30. In this example, the child 30 may continue game play while still connected with the grandparent, or game play performed by the shared AIP in which interactions are facilitated by the displayed cartoon-like character 62*b* may continue after the grandparent disconnects.

Figure 7A:
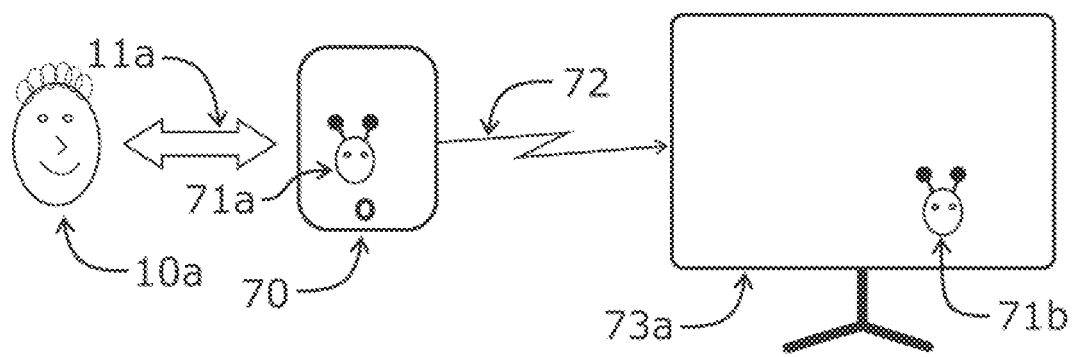
FIG. 7A illustrates a scene in which a grandparent initiates a card game (that may be augmented by a shared artificial intelligence personality) via distance communication.

FIG. 7A is a schematic showing key components and connections of a user 10*a* interacting 11*a* with an AIP represented by a cartoon-like character 71*a* displayed on a tablet device 70 that comprises a HIE. In this example, images projected on the HIE 70 are also cast 72 to a nearby television screen 73*a*. The process of casting may be performed wirelessly between the HIE and television, and/or involve direct communications by the television (or other display device) with image sources (i.e., via connected and/or remote streaming processors). The cartoon-like character representing the AIP within the HIE 71*a* may be viewed by the television screen 71*b* audience.

Figure 7B:
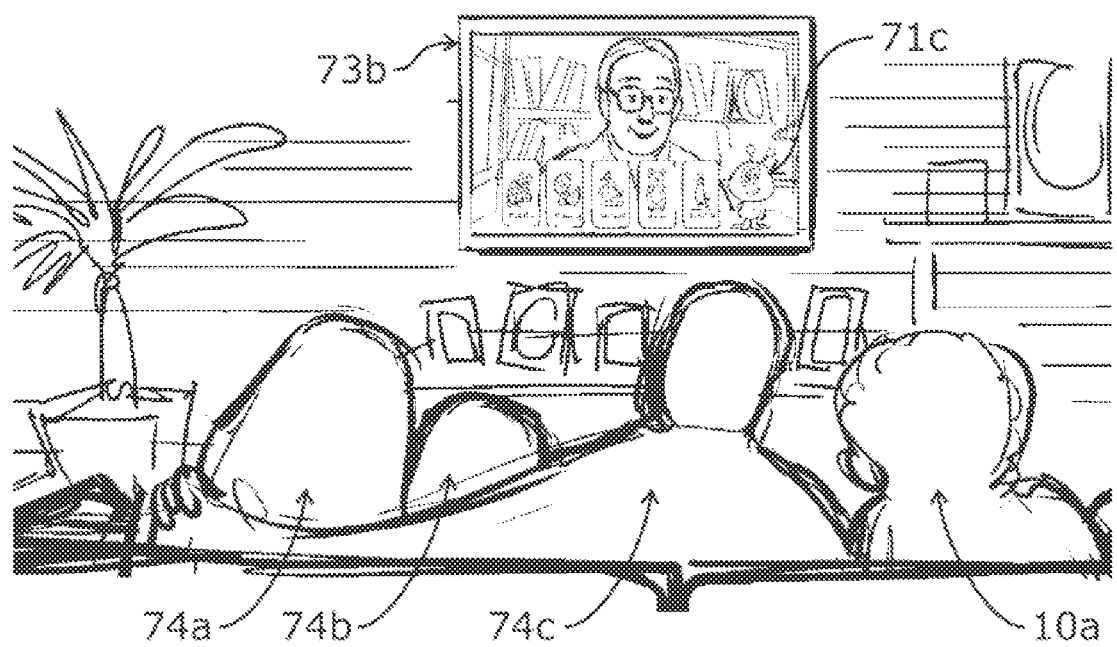
FIG. 7B shows a scene in which the child participating in the card game illustrated in FIG. 7A continues to play the game, augmented by the shared artificial personality (AIP) with or without continued connectivity by the grandparent.

FIG. 7B illustrates a scene consistent with the setup shown in FIG. 7A in which interactions by one user 10*a* may be shared with family 74*a*, 74*b*, 74*c*, friends, colleagues, service-providers, or other individuals and/or groups by casting those interactions to a large-format display device 73*b*. The display includes the cartoon-like character 71*c* that is a projection of the shared AIP (shown as 71*a* in FIGS. 7B and 71*b* in FIG. 7A) including both audio and video content. More generally, FIGS. 7A and 7B illustrate that local interactions with an AIP via an HIE may simultaneously include exchanges with multiple humans.

Figure 8A:
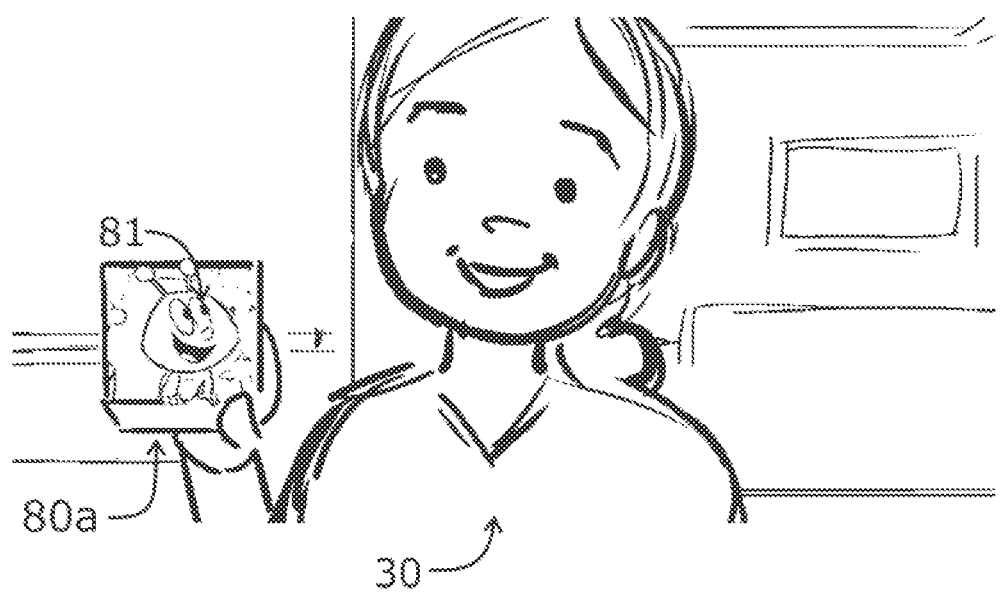
FIG. 8A shows an example of an untethered human interaction accessory (HIA) that includes a display showing a cartoon-like character to facilitate interactions with the shared artificial intelligence personality (AIP).

In further embodiments, FIG. 8A illustrates a scene in which a girl 30 interacts with an AIP represented by an interactive cartoon-like character 81 via a HIA that includes a display 80*a*. The HIA may transmit wirelessly to other HIAs and/or nearby processors where the one or more HIAs and/or nearby processing devices collectively comprise a HIE.

Figure 8B:
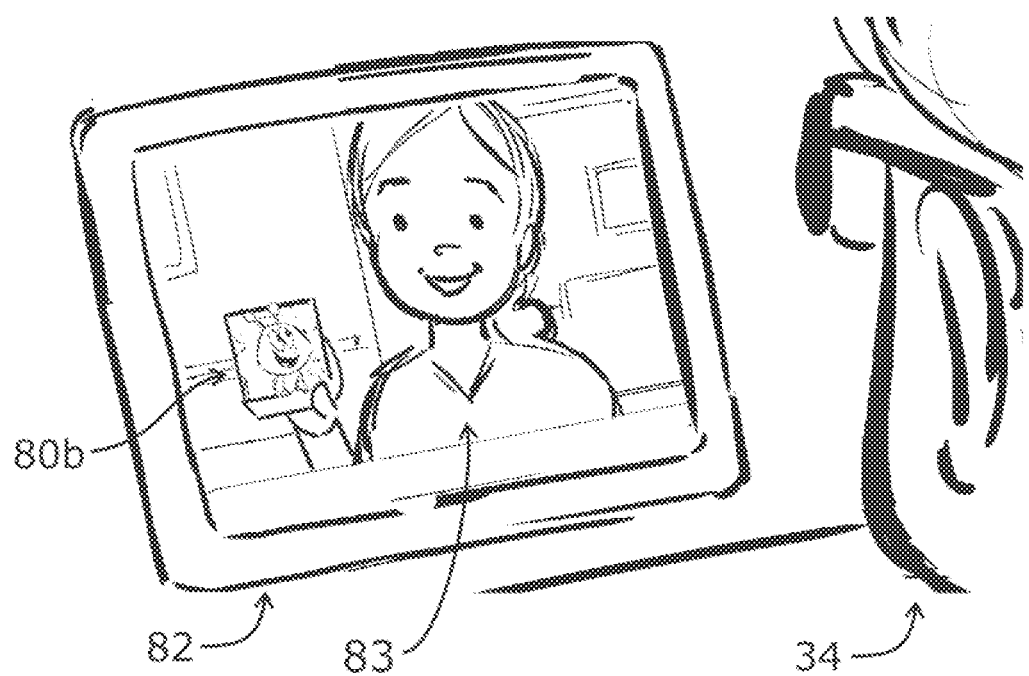
FIG. 8B demonstrates the use of a tablet as a human interaction entity (HIE) instantiated with a shared AIP by one participant during a distance communication session while simultaneously viewing the use of a different HIE platform, a toy-like human interaction accessory (HIA) instantiated with the shared AIP, by the other participant (depicted in FIG. 8A) during the interaction.

FIG. 8B illustrates a scene in which a video stream of the girl 83 shown in FIG. 8A is displayed on the screen of a tablet device 82 being viewed by a parent or grandparent 34. Video images of the girl 83 show her continuing to interact with an AIP via a HIA 80*b* during the distance communication session. More generally, FIGS. 8A and 8B illustrate that, during distance communications augmented by a shared AIP, different users may (depending on personal preferences and/or device availability) simultaneously use different combinations of HIE and HIA devices during such exchanges.

The foregoing disclosure of the exemplary embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. It will be appreciated that the various components and features described with the particular embodiments may be added, deleted, and/or substituted with the other embodiments, depending upon the intended use of the embodiments.

Further, in describing representative embodiments, the specification may have presented the method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims.

While the invention is susceptible to various modifications, and alternative forms, specific examples thereof have been shown in the drawings and are herein described in detail. It should be understood that the invention is not to be limited to the particular forms or methods disclosed, but to the contrary, the invention is to cover all modifications, equivalents and alternatives falling within the scope of the appended claims.

We claim:

1. A method to share an artificial intelligence personality among multiple human interaction entities to support social connectedness between two humans, comprising:
providing, in proximity to a first human, a first human interaction entity comprising a first electronic device that includes a first processor, one or more first interaction output devices operatively coupled to the first processor, and one or more first sensors operatively coupled to the first processor;
providing, in proximity to a second human, a second human interaction entity comprising a second electronic device that includes a second processor, one or more second interaction output devices operatively coupled to the second processor, and one or more second sensors operatively coupled to the second processor;
instantiating a first artificial intelligence personality into the first human interaction entity, comprising installing the first artificial intelligence personality with the first processor such that the first artificial intelligence personality interacts with the first human via the one or more first interaction output devices;
acquiring, during an interaction between the first human interaction device and the first human, interaction data from the one or more first sensors;
computing, with one or more artificial intelligence processors, a second artificial intelligence personality comprising a single cumulative personality based at least in part on the first artificial intelligence personality and the interaction data; and
instantiating, with the second processor, the second artificial intelligence personality into the second human interaction entity.

2. The method of claim 1, wherein the first human interaction entity is one of a robot, a robotic pet, a toy, an avatar, a displayed image, a virtual reality object, an augmented reality object, a hologram, and a hologram-like projection.

3. The method of claim 1, wherein the one or more first sensors comprise one or more of at least one environmental sensor for measuring one or more elements within the environment of the first human interaction entity, or at least one human interaction sensor for measuring interactions between the first artificial intelligence entity and the first human.

4. The method of claim 3, wherein the at least one environmental sensor comprises one or more cameras, light sensors, thermal sensors, motion sensors, accelerometers, global positioning system (GPS) transceivers, microphones, infrared (IR) sensors, galvanometric sensors, pressure sensors, switch sensors, magnetic sensors, proximity sensors, date and time clocks, Bluetooth transceivers, and Wi-Fi transceivers.

5. The method of claim 3, wherein the at least one human interaction sensor comprises one or more cameras, thermal sensors, motion sensors, accelerometers, microphones, infrared (IR) sensors, galvanometric sensors, heart rate sensors, electrocardiogram sensors, electrooculogram sensors, electroencephalogram sensors, pulse oximeters, pressure sensors, magnetic sensors, computer mice, joysticks, keyboards, touch screens, and proximity sensors.

6. The method of claim 1, wherein the interaction data comprise one or more of:
data acquired from the one or more environmental sensors,
data acquired from the one or more human interaction sensors,
physical states of one or more humans within the vicinity of the first human interaction entity,
physiological states of one or more humans within the vicinity of the first human interaction entity,
cognitive states of one or more humans within the vicinity of the first human interaction entity,
emotional states of one or more humans within the vicinity of the first human interaction entity,
changes in the physical, physiological, cognitive, or emotional states of one or more humans within the vicinity of the first human interaction entity,
one or more spoken words within the vicinity of the first human interaction entity,
one or more recognized objects within images acquired by the first human interaction entity, and
one or more gestures performed by one or more humans within the vicinity of the first human interaction entity.

7. The method of claim 1, wherein the one or more first interaction output devices comprise one or more of video display devices, hologram display devices, holographic-like projectors, speakers, propulsion systems, servos, motors, magnetic field controllers, orientation controllers, haptic controllers, light pointing devices, switch controllers, and controllable tactile surfaces.

8. The method of claim 1, wherein additional artificial personalities are computed using data that include additional interaction data from one or more of the first human interaction entity, the second human interaction entity, and additional human interaction entities.

9. The method of claim 8, wherein the additional artificial personalities are computed by one or more of the first human interaction processor, the second human interaction processor, additional human interaction processors, and one or more connected artificial intelligence processors.

10. The method of claim 9, wherein, once computed, the additional artificial intelligence personalities are instantiated into one or more of the first human interaction processor, the second human interaction processor, and additional human interaction processors.

11. The method of claim 1, wherein the interaction data include an indication of a first human desire to disconnect from interacting with the second human.

12. The method of claim 11, wherein the first human desire to disconnect from interacting with the second human is not known by the second human.

13. The method of claim 11, wherein the second artificial intelligence personality indicates, with one or more of the second interaction output devices, a second artificial intelligence personality desire to maintain connectedness with the second human in the absence of the first human.

14. The method of claim 11, wherein the second artificial intelligence personality indicates, with one or more of the second interaction output devices, a first human desire to disconnect from interacting with the second human.

15. The method of claim 11, wherein the interaction data include one of a time and a range of times, when the first human anticipates reconnecting with the second human.

16. The method of claim 15, wherein the second artificial intelligence personality maintains connectedness with the second human in a manner that anticipates that the first human reconnects with the second human after the time or range of times specified by the first human.

17. A method to share an artificial intelligence personality among multiple human interaction entities to support social connectedness between two humans, comprising:

providing, in proximity to a first human, a first human interaction entity comprising a first electronic device that includes a first processor, one or more first interaction output devices operatively coupled to the first processor, and one or more first sensors operatively coupled to the first processor;

instantiating an artificial intelligence personality into the first human interaction entity, comprising installing the artificial intelligence personality with the first processor such that the artificial intelligence personality interacts with the first human via the one or more first interaction output devices;

providing, in proximity to a second human, a second human interaction entity comprising a second electronic device that includes a second processor, one or more second interaction output devices operatively coupled to the second processor, and one or more second sensors operatively coupled to the second processor;

instantiating the artificial intelligence personality into the second human interaction entity, comprising installing the artificial intelligence personality with the second processor such that the artificial intelligence personality interacts with the second human via the one or more second interaction output devices;

acquiring, during an interaction between the first human interaction device and the first human, interaction data from the one or more first sensors;

determining, by the first processor based on the interaction data, a first human desire to stop interacting with the second human;

transmitting, from the first processor to the second processor, the first human desire; and initiating, by the artificial intelligence personality using the one or more second interaction output devices, one or more pre-determined activities with the second human.

18. The method of claim 17, wherein the one or more pre-determined activities include one or more of playing a game, participating in play with a toy, reading a story, watching a video, critiquing a movie, conversing, initiating a conversation with one or more other humans, performing a learning experience, helping to write a communication, drawing a picture, coding a program, paying a bill, planning an activity, reminding about upcoming events, building a virtual object, helping to construct a real object, and instructing to go to bed.

19. A method to share an artificial intelligence personality among multiple human interaction entities to support social connectedness between two humans, comprising:

providing, in proximity to a first human, a first human interaction entity comprising a first electronic device that includes a first processor, one or more first interaction output devices operatively coupled to the first processor, and one or more first sensors operatively coupled to the first processor;

instantiating an artificial intelligence personality into the first human interaction entity, comprising installing the artificial intelligence personality with the first processor such that the artificial intelligence personality interacts with the first human via the one or more first interaction output devices;

providing, in proximity to a second human, a second human interaction entity comprising a second electronic device that includes a second processor, one or more second interaction output devices operatively coupled to the second processor, and one or more second sensors operatively coupled to the second processor;

instantiating the artificial intelligence personality into the second human interaction entity, comprising installing the artificial intelligence personality with the second processor such that the artificial intelligence personality interacts with the second human via the one or more second interaction output devices;

acquiring, during an interaction between the first human interaction device and the first human, interaction data from the one or more first sensors;

determining, by the first processor based on the interaction data, one or more first human directives to the second human;

transmitting, from the first processor to the second processor, the one or more first human directives; and initiating, by the artificial intelligence personality using the one or more second interaction output devices, the one or more first human directives with the second human.

20. The method of claim 19, wherein the one or more first human directives include one or more of playing a game, participating in play with a toy, reading a story, watching a video, conversing, initiating conversation with one or more additional humans, performing a learning experience, helping to write a communication, helping to construct a drawing, coding a program, paying a bill, reminding about upcoming events, building a virtual object, helping to construct a real object, and instructing to go to bed.

* * * * *